(12) United States Patent
Gu et al.

(10) Patent No.: US 10,311,096 B2
(45) Date of Patent: Jun. 4, 2019

(54) ONLINE IMAGE ANALYSIS

(71) Applicant: Google LLC, Mountain View, CA (US)

(72) Inventors: Kunlong Gu, Belmont, CA (US); Sean Arietta, Oakland, CA (US); Charles J. Rosenberg, Cupertino, CA (US); Thomas J. Duerig, Sunnyvale, CA (US); Erik Murphy-Chutorian, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 844 days.

(21) Appl. No.: 13/780,848

(22) Filed: Feb. 28, 2013

(65) Prior Publication Data
US 2015/0169754 A1  Jun. 18, 2015

Related U.S. Application Data

(60) Provisional application No. 61/608,476, filed on Mar. 8, 2012.

(51) Int. Cl.
*G06F 17/00* (2019.01)
*G06F 16/583* (2019.01)

(52) U.S. Cl.
CPC ................. *G06F 16/5838* (2019.01)

(58) Field of Classification Search
CPC ................................. G06F 17/30864
See application file for complete search history.

(56) References Cited

U.S. PATENT DOCUMENTS

| | | | |
|---|---|---|---|
| 6,671,407 B1 * | 12/2003 | Venkatesan | G06F 17/30247 382/232 |
| 7,283,684 B1 * | 10/2007 | Keenan | G06K 9/527 345/644 |
| 7,672,508 B2 | 3/2010 | Li | |
| 7,813,561 B2 | 10/2010 | Jia et al. | |
| 2002/0078043 A1 * | 6/2002 | Pass | G06F 17/30256 |
| 2006/0224554 A1 * | 10/2006 | Bailey | G06F 17/30864 |
| 2008/0222125 A1 * | 9/2008 | Chowdhury | G06F 17/30864 |

(Continued)

OTHER PUBLICATIONS

"Research and Advanced Technology for Digital Libraries", International Conference on Theory and Practice of Digital Libraries, TPDL 2011.*

*Primary Examiner* — Etienne P Leroux
*Assistant Examiner* — Farhad Agharahimi
(74) *Attorney, Agent, or Firm* — Fish & Richardson P.C.

(57) ABSTRACT

Methods, systems, and apparatus, including computer programs encoded on a computer storage medium, for analyzing image search result relevance. In one aspect, a method includes receiving result data specifying a search query and responsive image search results that reference images that are responsive to the search query. A determination is made that the search query matches an indexed query. An image relevance model is identified for the indexed query. The image relevance model can output a relevance score adjustment factor for an image search result based on image feature values of the image that is referenced by the search result. A relevance score adjustment factor is determined for each image search result using the identified image relevance model. A relevance score for each image search result is adjusted using the image's image relevance score adjustment factor. The images are ranked based on the adjusted relevance scores.

18 Claims, 7 Drawing Sheets

(56) References Cited

U.S. PATENT DOCUMENTS

| | | |
|---|---|---|
| 2010/0080420 A1 | 4/2010 | Abe |
| 2011/0279293 A1* | 11/2011 | Deslandes .............. G06T 9/00 341/87 |
| 2012/0011112 A1* | 1/2012 | Bian .............. G06F 17/30864 707/723 |
| 2012/0128237 A1 | 5/2012 | Wang et al. |
| 2012/0179705 A1* | 7/2012 | Kumaran .......... G06F 17/30646 707/767 |

* cited by examiner

ONLINE IMAGE ANALYSIS

CROSS-REFERENCE TO RELATED APPLICATIONS

This application claims the benefit under 35 U.S.C. § 119(e) of U.S. Patent Application No. 61/608,476, entitled "ONLINE IMAGE ANALYSIS," filed Mar. 8, 2012, which is incorporated herein by reference in its entirety.

BACKGROUND

This specification relates to information retrieval, and analysis of image search results.

The Internet provides access to a wide variety of resources, such as image files, audio files, video files, and web pages. A search system can identify resources in response to a text query that includes one or more search terms or phrases. The search system ranks the resources based on their relevancy to the search query and importance and provides search results that link to the identified resources. The search results are typically ordered for viewing according to the rank.

Search systems generally rank search results based on relevancy scores that can be determined, in part, based on textual content or other features associated with the resource. For example, a relevancy score for a resource can be determined based on a comparison of the query to text included in the resource.

SUMMARY

In general, one innovative aspect of the subject matter described in this specification can be embodied in methods that include the actions of receiving result data specifying a search query and responsive image search results that reference images that are responsive to the search query; determining, during a query processing window for the search query, that the search query matches an indexed query, the determination being based on a similarity score for the search query and the indexed query, the query processing window for the search query being a period of time between receipt of the search query and responsive search results being provided to a user device in response to the search query; identifying an image relevance model for the indexed query, the image relevance model being a model that outputs a relevance score adjustment factor for an image search result based on image feature values of the image that is referenced by the image search result; for each of one or more of the responsive image search results that were specified by the result data and during the query processing window: determining, based on the image feature values of the image that is referenced by the responsive image search result, the relevance score adjustment factor for the responsive image search result, the relevance score adjustment factor being determined using the identified image relevance model; and adjusting, based on the relevance score adjustment factor, a relevance score for the responsive image search result; ranking the responsive image search results based on the adjusted relevance score for the responsive image search result; and providing the ranked responsive image search results in response to the search query. Other implementations of this aspect include corresponding systems, apparatus, and computer programs, configured to perform the actions of the methods, encoded on computer storage devices.

These and other implementations can each optionally include one or more of the following features. Aspects can further include accessing a historical data store that contains indexed queries, the indexed queries being search queries that were previously received from a user device; training, for each of one or more of the indexed queries, the image relevance model for the indexed query; and storing the trained image relevance model with a reference to the indexed query for which the image relevance model was trained.

Training the image relevance model for each of one or more indexed queries can include identifying a qualified query. The qualified query can be an indexed query for which at least a threshold number of images have at least a minimum relevance score for the indexed query, and at least a threshold number of user interactions have occurred with search results for the indexed query. In response to identifying the qualified query, the image relevance model for the qualified query can be trained.

Aspects can further include identifying an image that has been previously identified as being relevant to the indexed query; determining an estimated relevance score adjustment factor for the identified image, the estimated relevance score adjustment factor being based on an output of an image relevance model for the indexed query, the estimated relevance score adjustment factor being a value that is used by a search apparatus to determine whether the identified image is responsive to a search query that matches the indexed query; and storing the estimated relevance score adjustment factor with a reference to the identified image.

Determining the relevance score adjustment factor for the responsive image search result can include determining the relevance score adjustment factor for an image for which the estimated relevance score adjustment factor has not been determined.

Identifying the image that has been previously identified as being relevant to the indexed query can include determining that: the identified image includes a label that matches the indexed query; and the image similarity score for the identified image and each of at least a threshold number of other images that have been identified as relevant to the indexed query meets a similarity score threshold.

Aspects can further include scaling, for each of the one or more responsive image search results, the relevance score adjustment factor in proportion to a magnitude of the similarity score for the search query and indexed query.

Some search systems determine relevance scores for resources offline and reference the predetermined scores at query time. Although such an approach may support quick resource ranking, it may exclude some resources from the scoring process. For example, a new resource may be added after the most recent execution of the offline scoring process. Thus, the new resource would not receive a relevance score until the next execution of the scoring process.

Particular implementations of the subject matter described in this specification can be implemented so as to realize one or more of the following advantages. The relevance of images to a particular query can be analyzed online, e.g., at query time, rather than being precomputed prior to receipt of a query. Computing image relevance at query time enables evaluation of relevance of each image that has been identified as responsive to a query irrespective of whether the image was analyzed by an offline image relevance model. Thus, an online image relevance model, e.g., an image relevance model that is applied at query time, can analyze the relevance of images that have been recently indexed, and not yet analyzed by an offline image relevance model.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
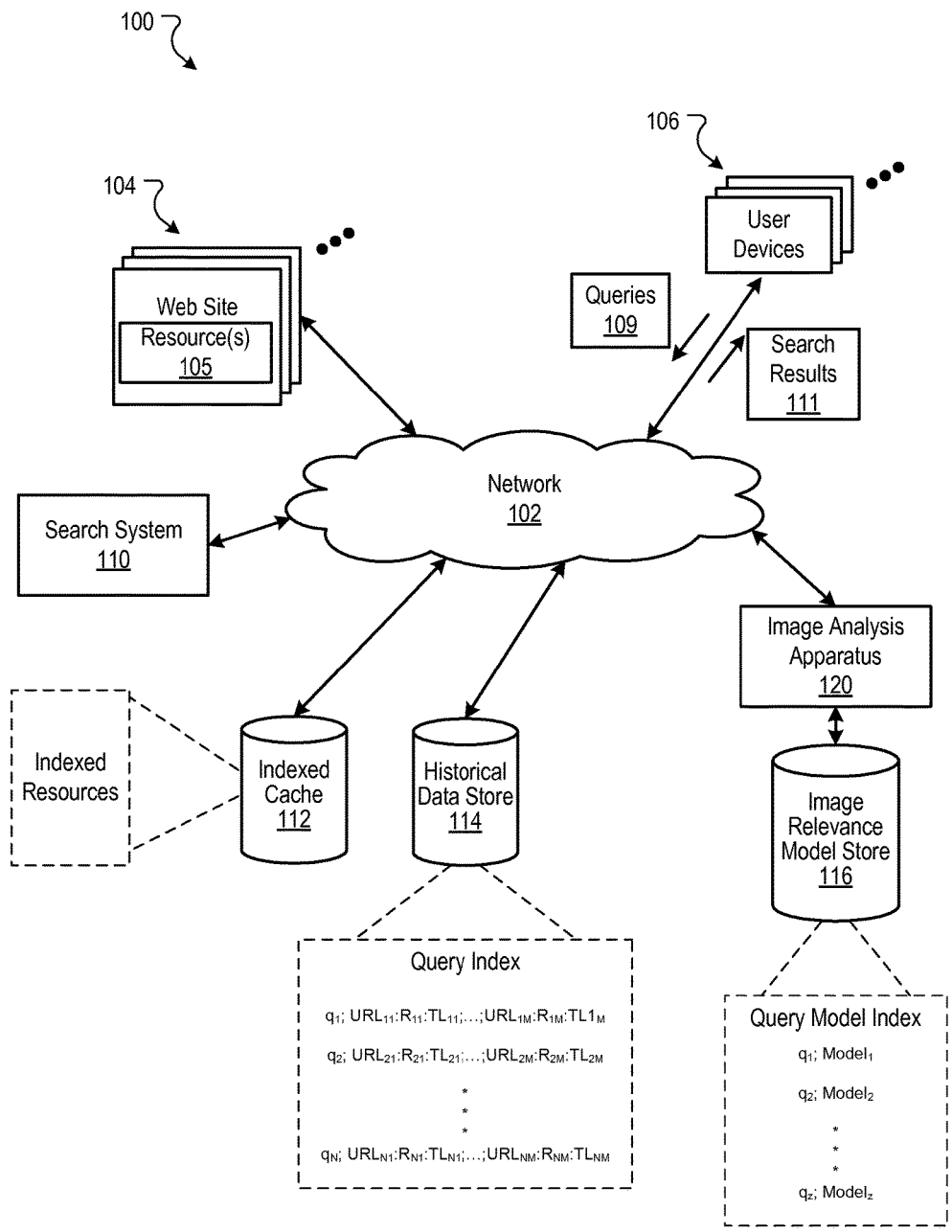
FIG. 1A is a block diagram of an example environment in which a search system provides search services.

FIG. 1A is a block diagram of an example environment 100 in which a search system 110 provides search services. A computer network 102, such as a local area network (LAN), wide area network (WAN), the Internet, a mobile phone network, or a combination thereof, connects web sites 104, user devices 106, and the search system 110. The environment 100 may include many thousands of web sites 104 and user devices 106.

A web site 104 is one or more resources 105 hosted by one or more servers, and can be associated with a domain name. An example web site 104 is a collection of web pages formatted in hypertext markup language (HTML) that can contain text, images, multimedia content, and programming elements, such as scripts. Each web site 104 is maintained by a publisher, e.g., an entity that manages and/or owns the web site.

A resource 105 is data provided over the network 102 and that is associated with a resource address. Resources 105 provided by web sites 104 include HTML pages, word processing documents, portable format (PDF) documents, images, video, and feed sources, to name just a few. The resources 105 can include content, such as words, phrases, images, and sound, and may include embedded information, e.g., meta information and hyperlinks, and/or embedded instructions, e.g., scripts.

A user device 106 is an electronic device that is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource 105 to which the data corresponds. The indexed and, optionally, cached copies of the resources 105 are stored in an indexed cache 112.

A user device, such as user device 106, can submit a search query 109 to the search system 110. The search system 110 performs a search operation that uses the search query 109 as input to identify resources 105 responsive to the search query 109. For example, the search system 110 may access the indexed cache 112 to identify resources 105 that are relevant to the search query 109. The search system 110 identifies the resources 105, generates search results 111 that identify the resources 105, and returns the search results 111 to the user devices 106.

The search query 109 can include one or more search terms. A search term can, for example, include a keyword submitted as part of a search query 109 to the search system 110 that is used to retrieve responsive search results 111. In some implementations, a search query 109 can include data for a single query type or for two or more query types, e.g., types of data in the query. For example, the search query 109 may have a text portion, and the search query 109 may also have an image portion. A search query 109 that includes data for two or more query types can be referred to as a "hybrid query." In some implementations, a search query 109 includes data for only one type of query. For example, the search query 109 may only include image query data, e.g., a query image, or the search query 109 may only include textual query data, e.g., a text query.

A search result 111 is data generated by the search system 110 that identifies a resource 105 that is responsive to a particular search query 109, and can include a link to the resource 105. An example search result 111 can include a web page title, a snippet of text or an image or portion thereof extracted from the web page, and a hypertext link, e.g., a uniform resource locator (URL), to the web page. An image search result typically includes a representation of the image referenced by the search result, but may not be the actual referenced image. For example an image search result may include a reduced-sized version of the referenced image, e.g., a thumbnail image, or a cropped version of the referenced image.

The search results 111 that are identified as relevant to a particular query can be ranked, for example, based on a ranking algorithm used by the search system 110. For example, the search system 110 can retrieve search results 111 based, at least in part, on the search terms or images submitted through a search query 109, and then rank the search results 111 based on one or more additional factors, as described in more detail below.

For a search directed to text, the search results 111 are typically ranked based, in part, on scores related to resources 105 identified by the search results 111, such as information retrieval ("IR") scores, or other relevance scores. In some implementations, the relevance scores are used in combination with quality scores, such as "page rank" scores, to rank the search results 111. The search results 111 are ordered according to these scores and are provided to the user device 106 according to the order.

The user devices 106 receive the search results pages and render the pages for presentation to the users. In response to the user selecting a search result 111 at a user device 106, the user device 106 requests the resource identified by the resource locator included in the search result 111. The web site 104 hosting the resource 105 receives the request for the resource 105 from the user device 106 and provides the resource 105 to the requesting user device 106.

Data for the search queries 109 submitted during user sessions are stored in a data store, such as the historical data store 114. For example, the search system 110 can store received search queries in the historical data store 114. For search queries 109 that are in the form of text, the text of the query is stored in the historical data store 114. For search queries 109 that are in the form of images, an index of the images is stored in the historical data store 114, or, optionally, the image is stored in the historical data store 114.

Selection data specifying actions taken in response to search results 111 provided in response to each search query 109 are also stored in the historical data store 114, for example by the search system 110. These actions can include whether a search result 111 was selected, e.g., clicked or hovered over, and for each selection, for which search query 109 the search result 111 was provided. As used herein, an image that is referenced in a search result is considered to be selected when a user interaction with the search result referencing the image has been determined to have occurred. In some implementations, the query data are stored in a query log and the selection data are stored in a separate selection log. In some implementations, the data stored in the historical data store, the query log, and/or the selection log are anonymized.

The data stored in the historical data store 114 can be used to map search queries 109 submitted during search sessions to resources 105 that were identified in search results 111 and the corresponding selection data. For example, the historical data can map how many times each image indexed in the indexed cache 112 was selected when presented in the form of a search result 111.

In some implementations, the historical data store 114 includes a query index that identifies queries received by the search system 110. The query index can also include, for each indexed query, e.g., $q_1$, additional information, such as information identifying resources 105 relevant to the query, e.g., $URL_{11}$, a relevance measure for the resource, e.g., $R_{11}$, and textual labels associated with the resource, e.g., $TL_{11}$.

The system 100 also includes an image analysis apparatus 120 to rank or score images for queries. Although illustrated and described as a separate apparatus, the image analysis apparatus 120 may be implemented as a part of the image search system 110.

For search queries directed to images, the search system 110 can interact with the image analysis apparatus 120 to rank images for referencing as search results. In some implementations, the search system 110 identifies images relevant to a received search query, for example based on relevance scores for the images with respect to the received query. The relevance scores are a measure of the relevance of the images to the received query. For example, an image having a relevance score that is higher than the relevance score of another image may be considered more relevant to the received query than the other image.

This relevance score may be based on IR scores, text content associated with the images, labels associated with the images, e.g., textual labels, and/or image relevance feedback scores. Textual content may be text referenced by a resource 105 that publishes the image or a label associated with the image. The relevance feedback score is a relevance measure that is generated based on user actions in response to an image appearing in search results. For example, click data specifying a number of times an image was selected from search results for a query can represent a measure of relevance of the image to the query. In some implementations, the relevance score used to identify images relevant to the received query is adjusted using a relevance score adjustment factor as described below.

The search system 110 can provide result data to the image analysis apparatus 120. This result data can specify the received query, the identified images, and the relevance score for each identified image. The image analysis apparatus 120 can process the result data to rank the images for the received query. In some implementations, the image analysis apparatus 120 returns to the search system 110 rank data that specifies a ranking or ordering of the images provided in the result data. In some implementations, the image analysis apparatus 120 may generate image search results that reference the images and provide the image search results to the user device 106 according to the ranking.

The image analysis apparatus 120 can determine a relevance score adjustment factor for each image using an image relevance model and adjust the received relevance scores using the relevance score adjustment factors. In general, the image analysis apparatus 120 determines a relevance score adjustment factor for an image based on a function of content feature values for the image and an appropriate image relevance model for that image.

In some implementations, the image analysis apparatus 120 performs at least a portion of the image ranking process for a query after the query is received by the search system 110, e.g., using an online scoring process. For example, the search system 110 may provide the result data to the image analysis apparatus 120 during a query processing window.

The query processing window can be defined as a period of time between receipt of the search query, for example at the search system 110, and the time at which responsive search results are provided or transmitted, for example by the search system 110 or the image analysis apparatus 120, to a user device or another data processing apparatus. In some implementations, the query processing window may be the time period between receipt of the search query and the time at which responsive search results are ranked for presentation. In some implementations, operations described in this document can be performed during a single query processing window for a particular query, such that the operations are performed following receipt of the query and prior to responsive search results being provided in response to the query.

The image analysis apparatus 120 determines, using an image relevance model, relevance score adjustment factors for images referenced in the result data and adjusts relevance scores for the images using the image relevance score adjustment factors. The relevance scores that are used to identify the images may be determined before and/or after receiving the query. For example, predetermined relevance scores for image and query pairs may be stored in the query index of the historical data store 114.

In some implementations, the image analysis apparatus 120 is configured to process each image search query as a whole and not as constituent parts. Thus, as used in the context of the image analysis apparatus 120, a query is one or more terms that are input by users of the devices 106 and received by the search system 110 as a query input for a search operation, and is not the constituent terms that make up the query. For example, the queries "dolphin," "exhibits," and "dolphin exhibits" are three separate and unique queries in the context of the image analysis apparatus 120.

In some implementations, query data and selection data are stored in the historical data store 114 for each unique query submitted by users. The query data are data that define queries of one or more words that were received, for example, as search queries 109. For example, if the queries "dolphin," "exhibits," and "dolphin exhibits" are each received by the search system 110, then query data and click data are stored in the historical data store 114 for each of the queries "dolphin," "exhibits," and "dolphin exhibits."

Because the search system 110 and image analysis apparatus 120 process each search query 109 as a whole, the image analysis apparatus 120 can create a corresponding image relevance model for each particular query. The image analysis apparatus 120 can create an image relevance model for each query indexed in the historical data store 114, or a proper subset thereof, and store the image relevance models in an image relevance model data store 116. In some implementations, the image analysis apparatus 120 identifies qualified queries and creates an image relevance model for each qualified query as described below. The image analysis apparatus 120 also maintains an index of queries and image relevance models in the image relevance model data store 116. This relevance model index maps the image relevance models to their corresponding query. For example, the relevance model index may include a list of queries, e.g., $q_1$ to $q_z$, and, for each query in the list, information identifying the image relevance model, e.g., $Model_1$, for the query, e.g., $q_1$.

The image analysis apparatus 120 can determine a relevance score adjustment factor for each image specified in result data using one of the image relevance models. As each received query may not directly match an indexed query for which an image relevance model has been created, the image analysis apparatus 120 can select from created image relevance models. For example, the image analysis apparatus 120 may select an image relevance model that has been trained for an indexed query that is similar to the received query. The image analysis apparatus 120 uses the selected image relevance model for the similar indexed query to determine the relevance score adjustment factors for the images. The image analysis apparatus 120 can use the relevance score adjustment factors to adjust the relevance scores for the images and rank the images based on the adjusted relevance scores.

At a high level, each image relevance model can be trained using content feature values of training images for which a relevance value is available. In turn, the image relevance model can be applied to content feature values of other images to determine a relevance score for the other images relative to the query. In general, a content feature value of an image is a value indicative of a visual characteristic of an image or a portion of the image. Example content feature values include color, histograms of image color or grayscale data, texture, edges, corners, geometric information, image centers of gravity, and other characteristics of a the image or a portion of the image. A content feature value can be local to a specific portion of the image or global for the entire image.

In some implementations, content feature values for each image are extracted and are transformed into an image content descriptor. The image analysis apparatus 120 can generate and store in the indexed cache 112 an image content descriptor for each image indexed in the indexed cache 112. As the image content descriptors are stored in the indexed cache 112 and can be used for online determination of a relevance score adjustment factor for the corresponding image, e.g., after receiving a query, the data size of the image content descriptors may be reduced to facilitate the online determination. For example, limiting the size of the image content descriptors can support quicker relevance scoring and less data storage requirements than would be required if the data size were not reduced.

Figure 1B:
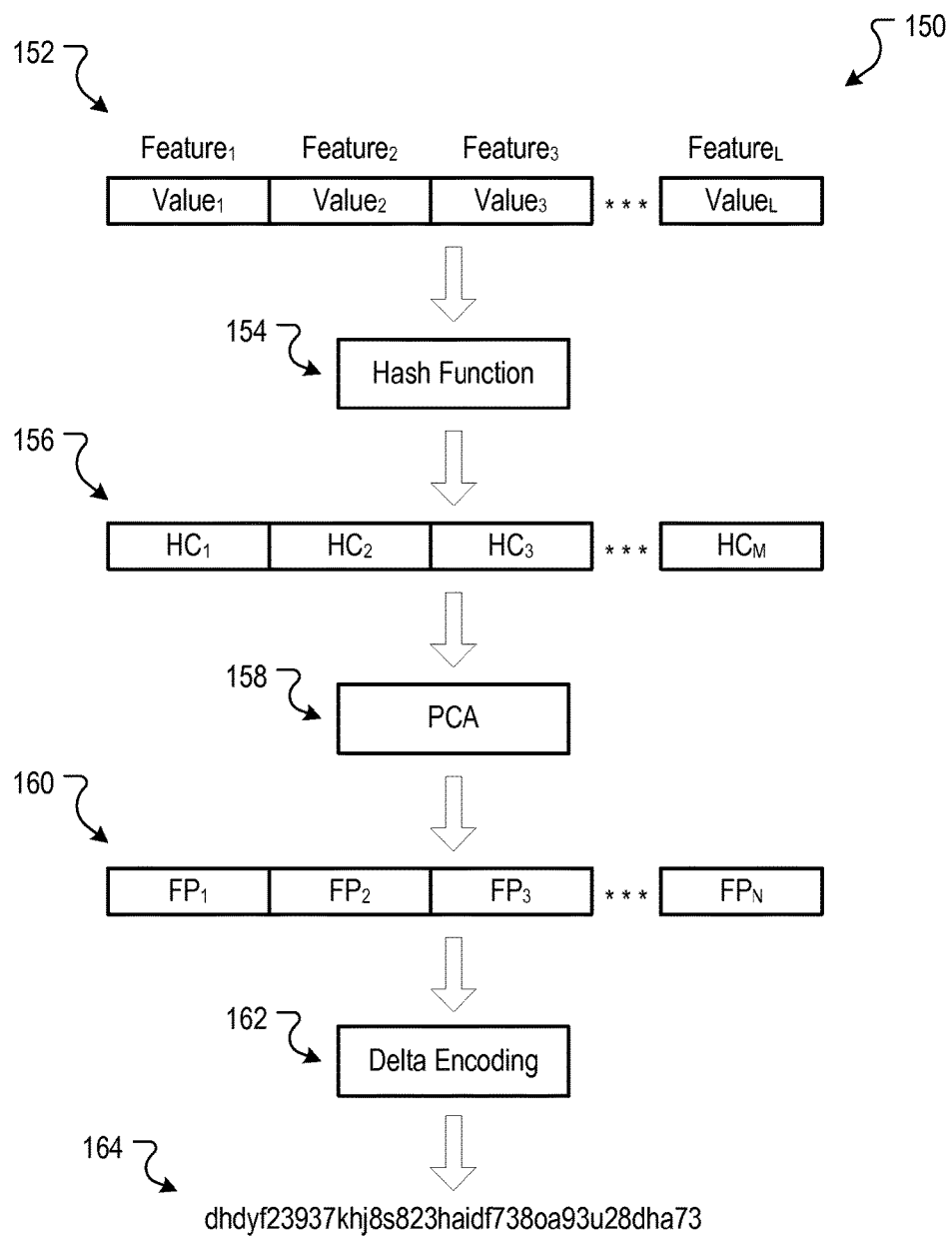
FIG. 1B is a block diagram of an example data flow for generating an image content descriptor for an image.

FIG. 1B is a block diagram of an example data flow 150 for generating an image content descriptor 164 for an image. The data flow 150 begins with the image analysis apparatus 120 extracting or receiving image content features of the image and concatenating the features into a feature representation 152. For example, these extracted features can include color, histograms of image color or grayscale data, texture, edges, corners, geometric information, image centers of gravity, and other characteristics of a portion of the image. Features can be extracted at multiple scales of the input, for example at different resolutions and/or at different sizes of the image.

To reduce the data size of the extracted features, the image analysis apparatus 120 generates hashes 156 from the feature representation 152. Hash functions can be used to express the feature representation of an image with descriptors that require less storage space than the feature representation itself. A hash function 154 converts the input data to a sequence of hash characters called a hash 156, where each hash character corresponds to a bit string. In some implementations, the bit string is unique. Locality-sensitive hashing is one hashing method that uses a particular family of probabilistic hash functions to map similar input data to similar hashes with a defined probability. Multiple hashes can be used to compute a measure of similarity between original sources of input data, for example an image or its feature representation.

In some implementations, the image analysis apparatus 120 generates the hashes 156 using a consistent weighting sampling process, e.g., weighted minhash. A consistent weighted sampling process can generate, for an input vector S, a hash that depends on sampled independent random variables and non-zero elements of S such that the probability of a hash collision between two vectors, S and T, equals their Jaccard similarity, which is a conventional statistic that measures the similarity of sample sets. The image analysis apparatus 120 can repeat the sampling process multiple times, e.g., 15,000 times, to generate multiple hashes 156 for the image feature representation 152. The multiple hashes 156 can be stored in a vector of image hashes.

The image analysis apparatus 120 can also perform kernel principal component analysis ("PCA") 158 on the image hashes. PCA is a conventional technique that transforms input data into a smaller number of components called principal components. The PCA process 158 can be configured such that the first principal components correspond to as much of the variability in the input data as possible. Kernel PCA is a variation of PCA that uses kernel methods such that the dot products performed by the PCA process 158 can be replaced by nonlinear operations. In some implementations, the PCA process 158 uses a histogram intersection kernel. Some kernels, e.g., a histogram intersection kernel, can transform the input data from an L1 function space to an L2 function space, such that the relevant distance metric on the output is the L2 distance. In some implementations, the L2 distance is a distance between two multi-dimensional vectors and can be determined by computing the difference between each pair of corresponding terms of the two vectors, squaring each difference, summing the squares of the differences, and computing the square root of the sum. Performing kernel PCA on the image hashes 156 can result in a vector of floating point numbers 160 that represent the image. In some implementations, the vector of floating point numbers contains around 500 floating point numbers.

The image analysis apparatus 120 can compress the floating point vector 160 using delta encoding 162. For example, two-level delta encoding can be used to compress the floating point vector. Because the PCA process 158 places the components with the highest variability first in the output floating point vector 160, a subset of the N elements with the highest variability of the output floating point vector 160 can be selected for compression by delta encoding. For example, using the first 59 elements of the output floating point vector 160 with a two-level delta encoding process can allow the output to be stored in 32 bytes of memory.

In some implementations, the image analysis apparatus 120 first multiplies the output floating point vector 160 of the kernel PCA process 158 by a randomly chosen rotation matrix in order to normalize variances of the kernel PCA output. The image analysis apparatus 120 can use one or multiple rotation matrices to normalize the kernel PCA output floating point vectors 160. After compressing the feature representation with delta encoding 162, the image analysis apparatus 120 generates an image content descriptor 164. In some implementations, the image content descriptor 164 for an image is around 32 bytes, which may be orders of magnitude smaller than the original representation of the extracted image features. Other sizes of image content descriptors are possible.

In some implementations, the delta encoding process can receive as input a vector of floating point numbers, e.g., a transformed feature representation of an image output by the PCA process, and can output a sequence of values that require less storage space than the input. The delta encoding process can be designed such that the L2 distance between input vectors is preserved on decompressed output values, for example within an error threshold.

The image analysis apparatus 120 identifies an upper bound of absolute values of all vector elements. The upper bound can be a magnitude of an element which no individual vector element in any vector is expected to exceed. In some implementations, the image analysis apparatus 120 uses a single value as an upper bound. In some implementations, the image analysis apparatus 120 can identify as an upper bound the vector element having the largest absolute value over multiple sample vectors.

The image analysis apparatus 120 computes a global maximum of absolute values of all vector elements in the vector. The image analysis apparatus 120 can identify which element in the input vector has the largest absolute value and can use this element as the vector's global maximum.

The image analysis apparatus 120 partitions the vector into blocks. The image analysis apparatus 120 identifies two or more partitions for the elements of the vector. The partitions need not be of equal size and need not be contiguous. In some implementations, partitioning the vector into blocks can help to maintain the variability of input elements. For example, if the vector is the output of a PCA process, the elements in the first block can be of much higher significance than elements in other blocks. Partitioning the vector into blocks can maintain variability of the elements by preventing all elements in a particular block from being encoded to a single value, e.g., zero.

The image analysis apparatus 120 computes local maxima of absolute values of vector elements for each block. The image analysis apparatus 120 can identify in each block the vector element that has the largest absolute value and can use this element as the block's local maximum.

The image analysis apparatus 120 encodes the global maximum relative to the upper bound. The encoding process can include mapping an input value to one of a series of intervals between a minimum value, e.g., zero, and a maximum value, e.g., the upper bound. For example, if four bits are available for encoding the global maximum relative to the upper bound, the image analysis apparatus 120 can compute 16 intervals—because four bits can represent 16 intervals—between zero and the upper bound. The image analysis apparatus 120 can then determine in which interval the global maximum falls. For example, if the upper bound is 6.4, the image analysis apparatus 120 can compute 16 intervals at 0-0.4, 0.4-0.8, 0.8-1.2, etc. If the global maximum is 5.91, the image analysis apparatus 120 can encode this value as 14, which is the number of the interval containing 5.91. Using 4 bits, the image analysis apparatus 120 can represent the global maximum as 1110, or, in hexadecimal notation, 0xE.

The image analysis apparatus 120 encodes each local maximum relative to the global maximum. The image analysis apparatus 120 can compute a number of intervals corresponding to a number of bits allocated to encode each local maximum. For example, if the global maximum is 3.2, with four bits the image analysis apparatus 120 can compute 16 intervals at 0-0.2, 0.2-0.4, etc. The image analysis apparatus 120 can then encode each local maximum relative to the global maximum, and can represent each local maximum with four bits. For example, if the local maximum is 0.53, the image analysis apparatus 120 can encode this value relative to the global maximum as hexadecimal value 0x2, the number of the interval containing 0.53.

The image analysis apparatus 120 encodes each vector element relative to its respective local maximum. Because the value of each vector element to be encoded can be signed, the last encoding relative to the local maximum can represent signed values. In some implementations, with four bits, the image analysis apparatus 120 can represent signed values from 7.5 to −7.5. Because some vector elements have been used as the global and/or a local maximum, a single vector element can be encoded multiple times. In some implementations, all vector elements are encoded at least once.

The image analysis apparatus 120 outputs the compressed content descriptor. The image analysis apparatus 120 can insert the bit representations of the global maximum, the local maxima, and each vector element into a compressed content descriptor. For example, for a 59-element input vector, the image analysis apparatus 120 can partition the vector into four blocks of 15, 15, 15, and 14 elements. After encoding with 4 bits each for the global maximum, the four local maxima, and the 59 individual vector elements, the compressed output image content descriptor can occupy 32 bytes.

Before the image relevance models are used, the image relevance models are trained by the image analysis apparatus 120. The image relevance models are typically trained using the same format of content feature values used for determining an image relevance adjustment factor for an input image. For example, if 59-element feature vectors of images are used in the scoring process, the model can be trained using 59-element feature vectors of training images.

For implementations that utilize 32 byte image content descriptors in place of larger feature vectors, the image relevance models can be trained based on image content descriptors for training images. In some implementations, the image analysis apparatus 120 determines an image relevance adjustment factor for an image by decompressing the image content descriptor for the image to regenerate a 59-element vector and applying the 59-element vector to the appropriate image relevance model. For such implementations, the image relevance models can be trained using 59-element vectors for training images. However, compressing a 59-element vector into a 32 byte image content descriptor and decompressing the 32 byte image content descriptor to generate a 59-element vector may not produce a 59-element vector that exactly matches the original 59-element vector. Because of this possible inconsistency, the image analysis apparatus 120 may generate 32 byte image content descriptors for training images and decompress the 32 byte image content descriptors to generate 59-element vectors. The image analysis apparatus 120 may then train the image relevance models using the decompressed 59-element vectors.

Figure 2:
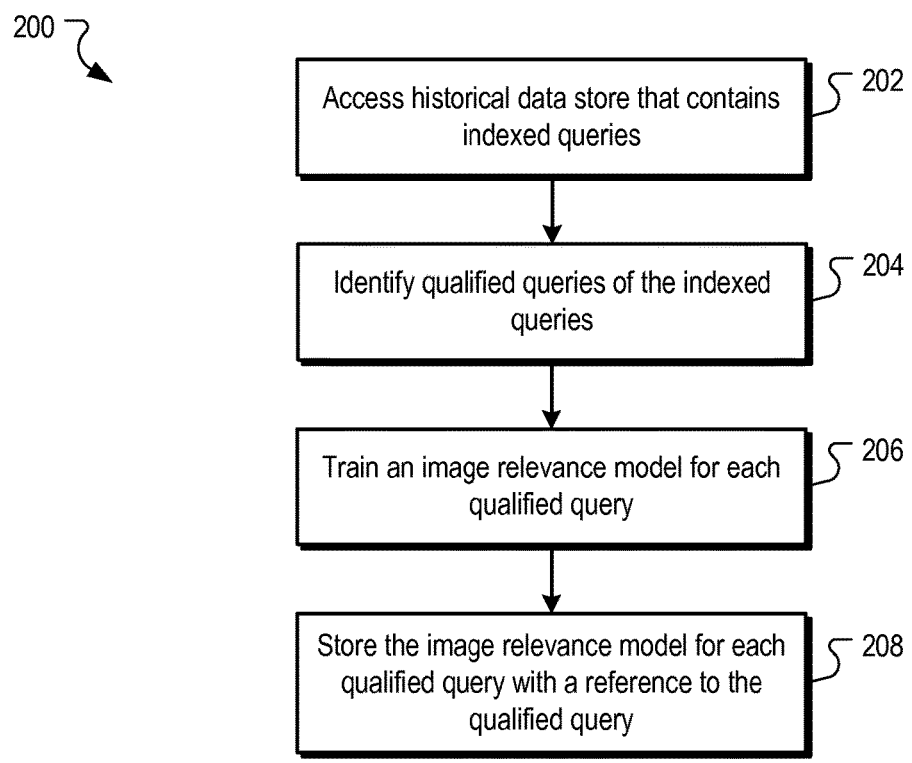
FIG. 2 is a flow chart of an example process for generating image relevance models.

FIG. 2 is a flow chart of an example process 200 for creating image relevance models. According to the process 200 of FIG. 2, the image analysis apparatus 120 accesses the historical data store 114 to obtain information regarding indexed queries (202). In some implementations, the information regarding the indexed queries specifies queries that were previously received from user devices and stored in the historical data store 114, as described above.

Figure 3:
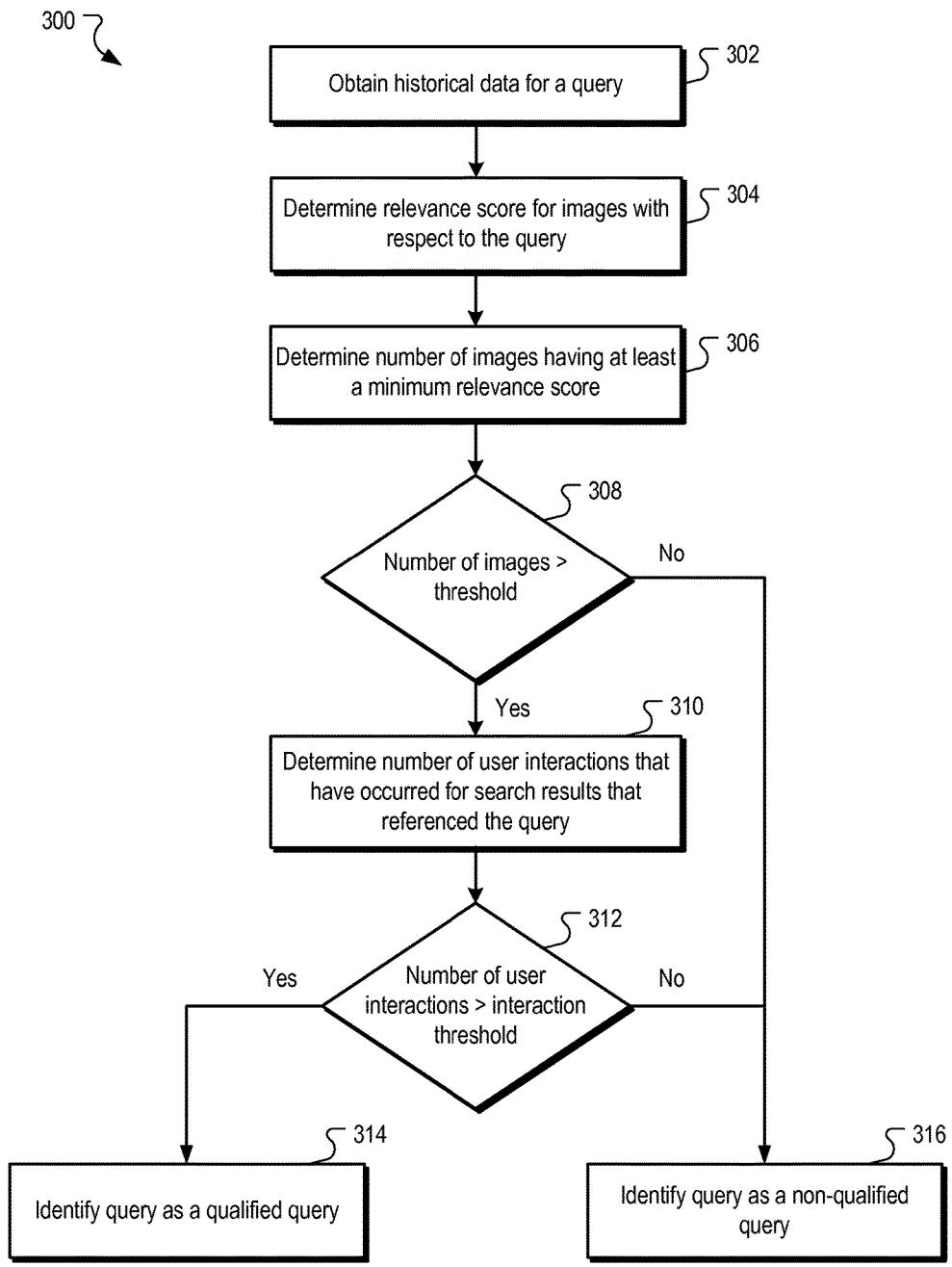
FIG. 3 is a flow chart of an example process for determining whether a query is a qualified query.

Using the query information, the image analysis apparatus 120 identifies qualified queries (204). In some implementations, a qualified query is an indexed query for which at least a threshold number of images have at least a minimum relevance score for the query. In some implementations, a qualified query can also be required to be an indexed query for which at least a threshold number of user interactions, e.g., selections and/or hovers, have occurred with search results for the query. An example process for determining whether an indexed query is a qualified query is illustrated in FIG. 3 and described below.

The image analysis apparatus 120 trains an image relevance model for each qualified query (206). In some implementations, the image analysis apparatus 120 can train an image relevance model for each qualified query by first selecting images that are relevant to that qualified query and other images that are relevant to other queries, or likely not relevant to the qualified query. In some implementations, content feature values for each image can be extracted and transformed into a sparse representation using a precomputed dictionary of visual terms that represent a set of regions having similar feature values.

Thereafter, an image relevance model for each qualified query can be learned. In some implementations, the image relevance model can be of the form that generates a score for an image based on the content feature values of the image, e.g., $$IRS = f(M_{Query}, F_{Image})$$

Where IRS is an image relevance score, $M_{Query}$ is the model for the query and $F_{Image}$ are the content feature values for the image. For example, $M_{Query}$ may be a vector of parameters learned for the model, $F_{Image}$ may be a vector of content feature values for the image, and the function may be a dot product of the two vectors or another function of the two vectors. In some implementations, the vector of content feature values can be a sparse vector of feature values representing an input image. In some implementations, the vector of content feature values representing an input image can be determined by generating a 32 byte image content descriptor for the image as described above and decompressing the image content descriptor into a 59-element vector.

To select training images, the image analysis apparatus 120 identifies images as being relevant to a query based on a relevance measure between the image and the query. In some implementations, the relevance measure is based on a relevance feedback score. The relevance feedback score is a relevance measure that is generated based on user actions in response to an image appearing in search results. For example, click data specifying a number of times an image was selected from search results for a query can represent a measure of the relevance of the image to the query. The image analysis apparatus 120 can derive the relevance measure from the historical data logs 114.

In some implementations, training an image relevance model for a query includes training the image relevance model to be predictive of the relevance of content feature values of images to the query. In some implementations, each image relevance model can be implemented as a passive-aggressive model for image retrieval ("PAMIR"). One example of a PAMIR is described in "A Discriminative Kernel-Based Model to Rank Images from Text Queries" David Grangier, Samy Bengio, IEEE Transactions on Pattern Analysis and Machine Intelligence, vol. 30 (2208), pp. 1371-1384, which is incorporated herein by reference in its entirety.

PAMIR is a linear model that can be applied to infer non-linear decisions. PAMIR is implemented as a vector of weights, with each weight corresponding to a distinct visual term. A PAMIR model can be trained by iteratively computing dot products of the vector of weights representing the model and image content feature vectors representing the training images.

In some implementations, the image analysis apparatus 120 initializes the vector of weights to default values to begin the training process. For example, the image analysis apparatus 120 can assign the default values based on values of weights for a model that was trained for a similar query, or based on the values of weights for a model that was trained using similar training images. In some implementations, each of the weights can be assigned a default value of "0."

In some implementations, the image analysis apparatus 120 can compute a dot product for the initialized image relevance model and each of the vectors, e.g., sparse vectors or 59-element vectors generated by decompressing a compressed 32 byte image content descriptor, of the training images to generate training scores for each of the images. A distance, e.g., mathematical difference, between the training scores can be computed. When a training score margin, e.g., minimum distance, is identified for the training scores, the model may not be adjusted and training scores for another pair of images can be considered. When the training score margin is not identified for the training scores, the model can be adjusted to increase the distance between the training scores, for example, by adjusting the vector of weights. The training score margin can be specified globally for all content features of the images and/or specified or altered for each individual content feature.

In some implementations, the vector of weights can be adjusted such that each weight is proportional to a minimum difference between the vectors for the images. The vector of weights can also be adjusted such that each weight is proportional to a maximum of a specified aggressiveness constant, e.g., constant that controls a tradeoff between minimizing expected error of future iterations and maintaining low vector weights, and a ratio of the distance between the training scores and a Euclidean norm of a vector representing the difference between the vectors.

In some implementations, the image analysis apparatus 120 iteratively repeats the training process until a training condition is satisfied. In some implementations, the training condition can require that the average number of adjustments of the vector of weights over a previous N iterations be below a threshold. For example, the training condition can specify that a trained model be a model that has been adjusted following no more than 10 of the last 10,000 iterations. In this example, a model having a vector of weights that has only been adjusted 9 out of the last 10,000 iterations can be identified as or deemed a trained model.

In some implementations, the training condition can specify that the average value adjustment of the vector of weights be less than a threshold amount. For example, the difference between weights of the vector prior to an iteration and following the iteration can be computed. The average difference over a previous N iterations can be computed. When the average difference is less than the threshold amount, the model can be identified as trained.

The image analysis apparatus 120 stores the image relevance models (208). In some implementations, the image analysis apparatus 120 stores the image relevance models in an image relevance model data store 116 with a reference to the corresponding query. For example, the image relevance model data store 116 may include a relevance model index that maps each image relevance model to its corresponding query.

The preceding paragraphs have described an example process by which an image relevance model can be trained. Other methods of training image relevance models can also be used, as can other content feature value extraction techniques.

FIG. 3 is a flow chart of an example process 300 for determining whether an indexed query is a qualified query. Historical data for an indexed query is obtained (302). In some implementations, the image analysis apparatus 120 obtains historical data for the indexed query from the historical data store 114. For example, the image analysis apparatus 120 may access the historical data store 114 to obtain information regarding images selected when presented in response to the indexed query and/or interaction information regarding interactions that have occurred with search results that have been presented in response to the indexed query. The information regarding images selected when presented in response to the indexed query can include information identifying each selected image.

A relevance score is determined for each image with respect to the indexed query (304). For example, the image analysis apparatus 120 can determine, or otherwise obtain, the relevance scores. The relevance score for an image and the indexed query can be determined based on IR scores, page rank scores, textual content associated with the image and/or a relevance feedback score for the image with respect to the indexed query, such as click data specifying a number of times the image has been selected from search results for the indexed query.

A count of the number of images having at least a minimum relevance score for the indexed query is determined (306). For example, the image analysis apparatus 120 can compare the relevance score for each image to a threshold relevance score and determine the number of images that have a relevance score that meets or exceeds the threshold relevance score. The threshold relevance score may be specified by a system designer, for example.

A determination is made whether the number of images having at least the minimum relevance score exceeds a threshold (308). For example, the image analysis apparatus 120 can compare the number of images having at least the minimum relevance score to the threshold. If the number of images having at least the minimum relevance score does not exceed the threshold, then the image analysis apparatus 120 may identify the indexed query as a non-qualified query (316).

If the number of images having at least the minimum relevance score exceeds the threshold, a count of the number of interactions that have occurred for search results that reference the indexed query is determined (310). For example, the image analysis apparatus 120 may determine, from the historical data for the indexed query, the total number of search result selections for the indexed query.

A determination is made whether the number of user interactions that have occurred for search results that reference the indexed query exceeds an interaction threshold (312). For example, the image analysis apparatus 120 can compare the number of user interactions that have occurred for search results that reference the indexed query to the interaction threshold, e.g., a non-zero value. If the number of user interactions that have occurred for search results that reference the indexed query exceeds the interaction threshold, the image analysis apparatus 120 identifies the indexed query as a qualified query (314). If the number of user interactions that have occurred for search results that reference the indexed query does not exceed the interaction threshold, the image analysis apparatus 120 identifies the indexed query as a non-qualified query (316).

In some implementations, the image analysis apparatus 120 identifies candidate images for at least a portion of the queries indexed in the historical data store 114. The candidate images for a query can include, for example, images that have been previously identified as being relevant to the query, for example, using an offline selection process. As there may be millions of images indexed in the indexed cache 112 and the relevance scoring can be performed after receiving a query, e.g., online, scoring every image may reduce the response time of the image analysis apparatus 120. Thus, a portion of the candidate images may be preselected for some or all of the queries, and these preselected candidate images can be ranked alone or with other images, e.g., images that are scored using an online scoring process, at query time using the online scoring process. This candidate image pre-selection feature is an optional offline process that can be used to reduce the number of images scored at query time. In addition to improving response time, pre-selecting candidate images offline before receiving a query can also help ensure semantic similarity between the candidate images and the query.

In some implementations, the image analysis apparatus 120 indexes candidate images in the query index of the historical data store 114. When the search system 110 receives a query, the search system 110 can access the query index to identify any previously identified candidate images for the received query, e.g., identified using the offline selection process, and, if pre-selected candidate images have been identified for the query, specify the identified pre-selected candidate images in the result data provided to the image analysis apparatus 120.

In some implementations, the image analysis apparatus 120 determines an estimated relevance score adjustment factor for each candidate image. These estimated relevance score adjustment factors can be determined using an offline scoring process and can be stored, for example in the query index of the historical data store 116. The estimated relevance score adjustment factors can then be used to select images for online scoring when the query is received.

Figure 4:
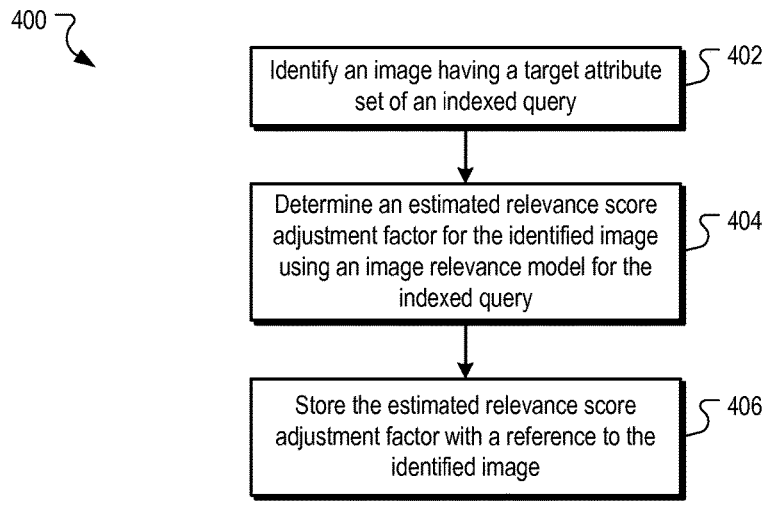
FIG. 4 is a flow chart of an example process for determining an estimated relevance score adjustment factor for an image.

FIG. 4 is a flow chart of an example process 400 for determining an estimated relevance score adjustment factor for an image. An estimated relevance score adjustment factor can be determined for each candidate image using an offline scoring process. In some implementations, a candidate image for a query is an image that has a target attribute set for the query.

An image having a target attribute set for an indexed query is identified (402). For example, the image analysis apparatus 120 may identify an image having a target attribute set based on whether the image has a label that matches the indexed query and/or whether a threshold number of images relevant to indexed query have at least a minimum similarity score with respect to the image.

An estimated relevance score adjustment factor is determined for the image with respect to the indexed query (404). In some implementations, the image analysis apparatus 120 determines the estimated relevance score adjustment factor using an image relevance model for the indexed query or an image relevance model for a query similar to the indexed query. For example, the image analysis apparatus 120 may apply an image relevance model to a decompressed version of an image content descriptor for the image to determine the relevance score adjustment factor for the image.

If an image relevance model has not been created for the indexed query, the image analysis apparatus 120 may identify a similar query that has a corresponding image relevance model and use the image relevance model of the similar query to determine the estimated relevance score adjustment factor. In some implementations, the estimated relevance score adjustment factor for the image is scaled or weighted using a query similarity score for the indexed query and the similar query associated with the image relevance model. The query similarity score for the indexed query and another query is a measure of similarity between the two queries. A query similarity score for a pair of queries can be determined based on a synonym score, an edit distance score, a transformation cost score, and/or measures of similarity based on co-click data, for example. Measures of co-click data can be indicative of a frequency with which the same images are clicked for two different queries, where a higher co-click score is more indicative of two queries being similar than a lower co-click score.

The determined estimated relevance score adjustment factor is stored (406). For example, the image analysis apparatus 120 may store the estimated relevance score adjustment factor in the query index of the historical data store 114 with a reference to the indexed query and to the image.

Figure 5:
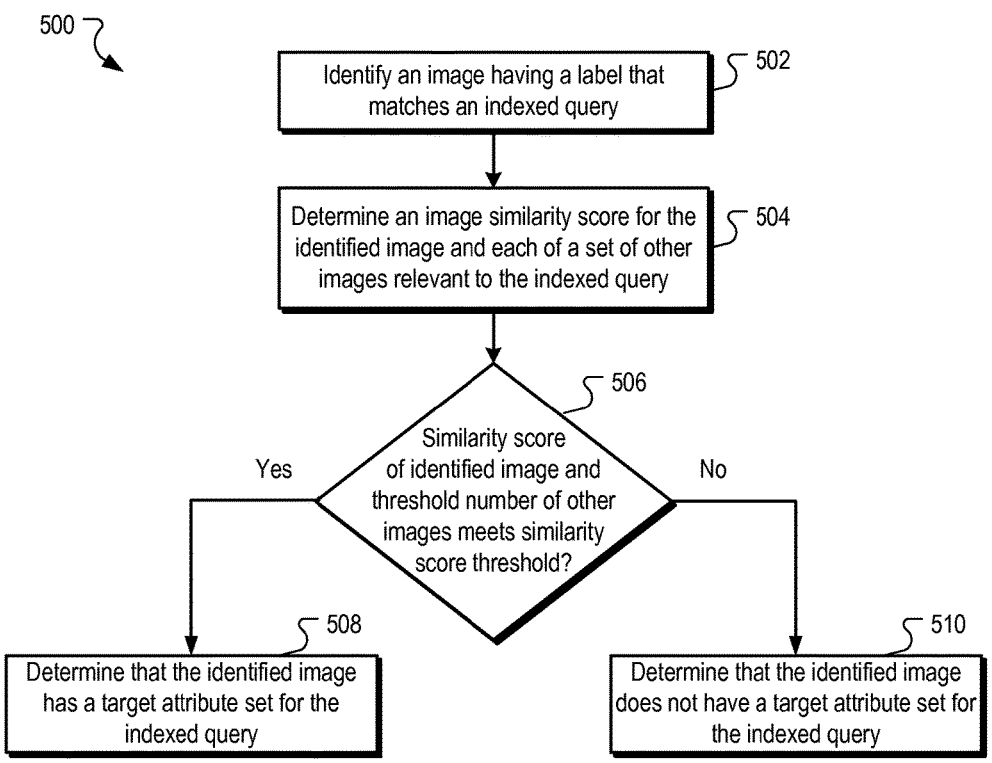
FIG. 5 is a flow chart of an example process for identifying an image having a target attribute set for a query.

FIG. 5 is a flow chart of an example process 500 for identifying an image having a target attribute set for a query. An image having a label that matches an indexed query is identified (502). For example, the indexed cache 112 may include one or more labels for each image. These labels may be assigned to the images by the search system 110. The search system 110 may assign one or more labels to an image based on text associated with the image, text associated with a resource 105 that references the image, or based on the image being selected from search results provided in response to a particular query. For example, a label specifying the particular query may be assigned to the image.

The image analysis apparatus 120 may access the indexed cache 112 to identify an image having a label that matches the indexed query. In some implementations, the label does not have to match the indexed query in its entirety. Rather, a label may match the indexed query if the label is sufficiently similar to the indexed query. This similarity may be based on cosine similarity, synonym similarity, or other measures indicative of query similarity, as described above.

An image similarity score is determined for the image and each of a set of other images that are relevant to the indexed query (504). This image similarity score is a measure of the similarity of the image and another image. In some implementations, the image analysis apparatus 120 determines the image similarity score for two images by processing the image content descriptors for the two images.

To determine the image similarity using the image content descriptors for the two images, the image analysis apparatus 120 can decompress the image content descriptors and compute a distance measure between the two decompressed image content descriptors. In some implementations, a complete reconstruction of the input vector is not possible due to quantization from the encoding process. In some implementations, decompressing each value of the compressed image content descriptor includes multiplying the value by the encoded block local maximum, the encoded global maximum, and the upper bound. After decompressing the two image content descriptors, the image analysis apparatus 120 can compute the distance between each decompressed image content descriptor using an appropriate distance metric, e.g., the L2 distance.

A determination is made whether a threshold number of images relevant to the indexed query have at least a minimum similarity score with respect to the image (506). For example, the image analysis apparatus 120 may compare the similarity score for the image and each other image relevant to the indexed query to a threshold to determine how many of the similarity scores exceed a similarity score threshold. The image analysis apparatus 120 can compare the number of similarity scores that exceed the similarity score threshold to another threshold. If the number of similarity scores exceeds the threshold, then the image analysis apparatus 120 may determine that the image has a target attribute set for the indexed query (508). If the number of similarity scores does not exceed the threshold, then the image analysis apparatus 120 may determine that the image does not have a target attribute set for the indexed query (508).

Figure 6:
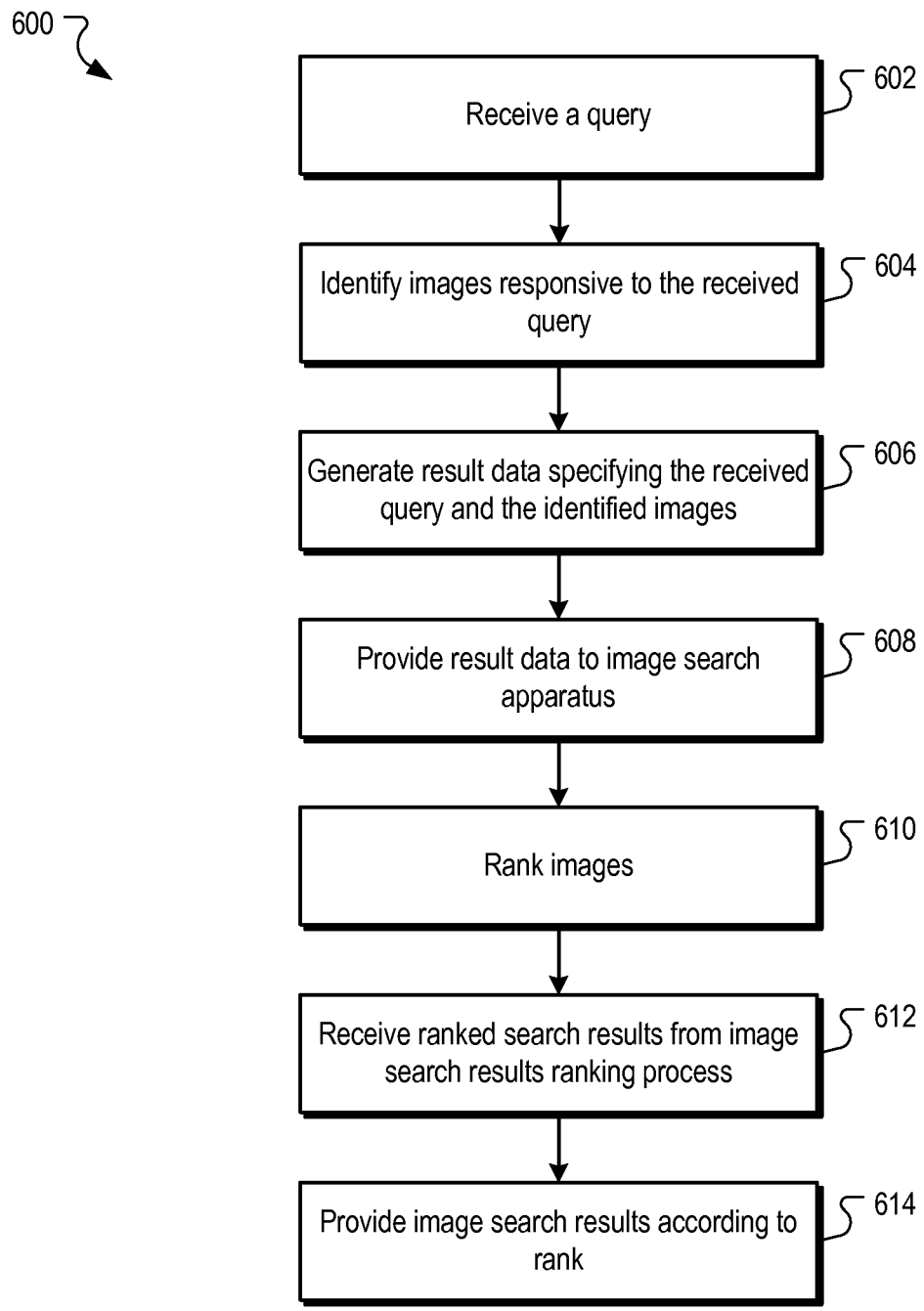
FIG. 6 is a flow chart of an example process for providing search results in response to a search query.

FIG. 6 is a flow chart of an example process 600 for providing search results in response to a search query. Query data defining a query is received (602). The received query can be, for example, an image search query submitted by a user via a user device 106. The query data can be received, for example, by the search system 110.

Responsive images are identified for the received query (604). In some implementations, the image analysis apparatus 120 determines whether candidate images have been indexed for the received query, e.g., using an offline candidate image selection process as described above. For example, the search system 110 may access the historical data store 114 and compare the received query to each indexed query. If there is a match, then the search system 110 may identify any candidate images for the matching indexed query. As described above, the use of candidate images is optional.

In some implementations, the search system 110 determines or otherwise obtains relevance scores for images indexed in the indexed cache 112. The relevance score for each image and the received query can be determined based on IR scores for the images, textual content associated with the image, and/or a relevance feedback score for the image with respect to the received query, such as click data specifying a number of times the image has been selected from search results for the received query. In some implementations, the search system 110 identifies, as responsive images, a certain number of the images having the highest relevance scores. In some implementations, the search system 110 identifies, as responsive images, images having a relevance score that exceeds a threshold, for example, a threshold specified by a system designer or administrator.

The search system 110 can identify both candidate images, e.g., images that have been previously indexed for the query as described above, and other images, e.g., non-candidate images, as being responsive to the query. In some implementations, the search system 110 identifies all or a portion of the candidate images that have been indexed for the query and a number of other images that have not been indexed as responsive images for the query. For example, the image analysis apparatus 120 may identify, as responsive images, candidate images based on the estimated relevance scores for the candidate images, where the estimated relevance scores may be based on an offline scoring process, as described above. Additionally, the image analysis apparatus 120 may identify, as responsive images, the other images that are identified as relevant to the query based on an online scoring process, e.g., a scoring process that is performed at query time.

The image analysis apparatus 120 may identify, as responsive images, a certain number of the candidate images having the highest estimated relevance scores or each candidate image having at least a threshold estimated relevance score, as determined using the offline scoring process and/or the adjustment factor described above. The other images may be selected based on the relevance scores for the other images, which are based on the output of the online scoring process.

For example, the image analysis apparatus 120 may identify, as responsive images, a certain number of the other images having the highest relevance scores or each other image having at least a threshold relevance score. This allows the search system 110 to include newer images that may not have been processed for selection as a candidate image, for example those image that have not been processed by an offline candidate image selection process.

Result data is generated (606). For example, the search system 110 may generate result data specifying the received query, the images identified as being responsive to the query, and the relevance score for each identified image. In some implementations, the result data may include the identified images or an image content descriptor for each identified image. For example, the search system 110 may access the indexed cache 112 to obtain an image content descriptor for each identified image. The result data can identify each image that was identified as responsive to the query or a proper subset thereof.

The generated result data is provided to the image analysis apparatus 120 (608). For example, the image search system 110 may transmit the result data to the image analysis apparatus 120 over the network 102.

Figure 7:
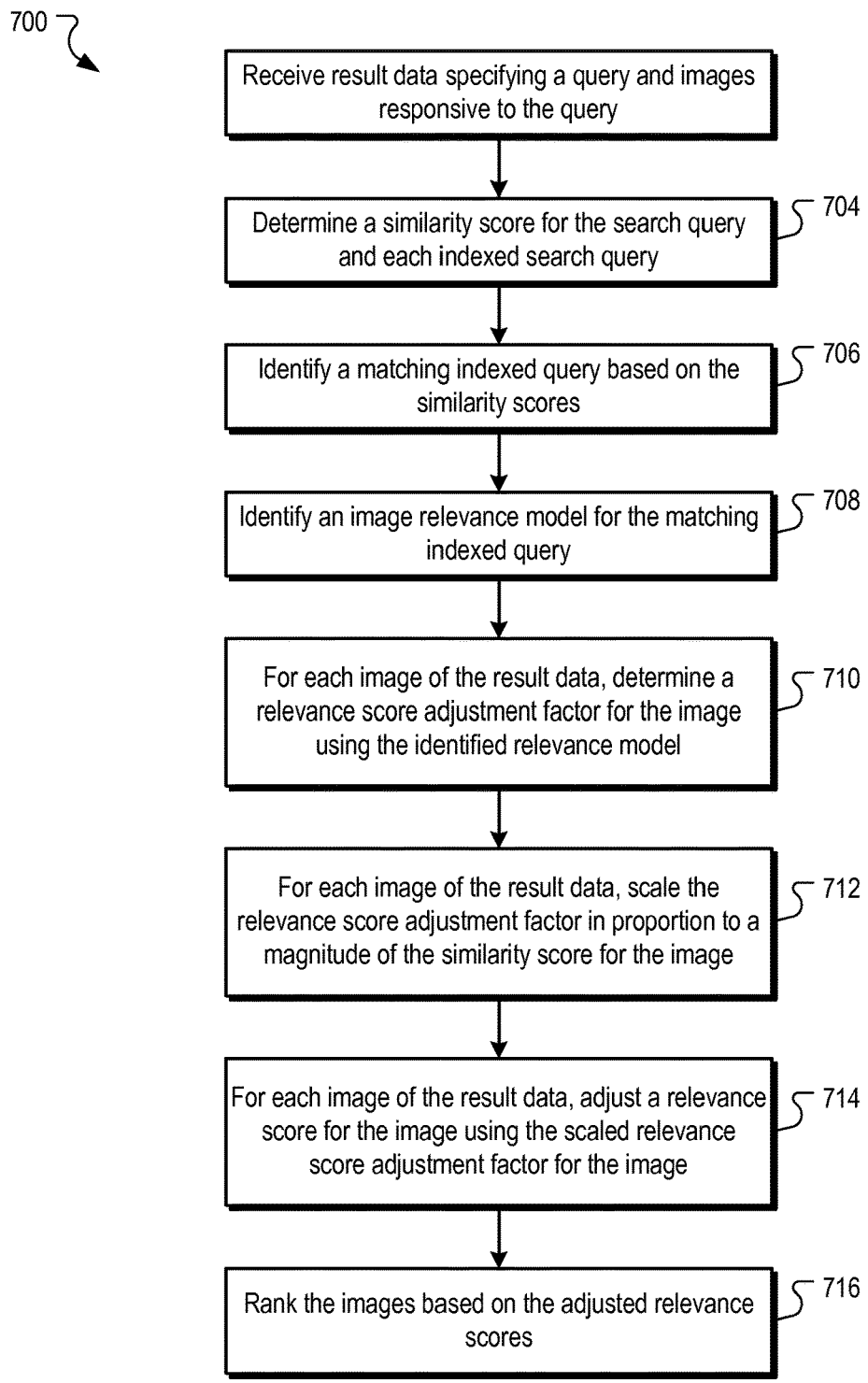
FIG. 7 is a flow chart of an example process for ordering search results.

The image analysis apparatus 120 ranks the images included in the result data (610). In some implementations, the image analysis apparatus 120 can determine an adjusted relevance score for each of the images in the result data and rank the images based on the adjusted relevance scores. For example, the image analysis apparatus 120 may determine a relevance score adjustment factor for each image using an image relevance model for the received query and adjust the relevance score for each image using the respective relevance score adjustment factor. An example process for ranking images is illustrated in FIG. 7 and described below.

Image rank data specifying a ranking of the images is received (612). For example, the image analysis apparatus 120 may generate image rank data and transmit the image rank data to the search system 110. In some implementations, the image rank data includes, for each image, a relative rank position. For example, the highest ranked image may include a rank position of "1," a second highest ranked image may include a rank position of "2," and so on. In some implementations, the image rank data includes the adjusted relevance score for each image. In such implementations, the search system 110 may rank the images based on the adjusted image relevance scores.

Image search results are provided based on the ranking (614). For example, the search system 110 may generate image search results that reference the images and provide the image search results to the user device 106 that submitted the query. The provided images search results may be ordered according to the ranking.

Some or all of the operations of the process 600 can be performed during a query processing window for a particular query. For example, in some implementations, at least the operations corresponding to blocks 604-612 of the flow chart may be performed during the query processing window for a particular query. For example, block 602 may be indicative of the beginning of the query processing window for the particular query and block 614 may be indicative of the end of the query processing window for the particular query. In some implementations, the operations corresponding to blocks 604-610 of the flow chart may be performed during the query processing window for the particular query, while the operations corresponding to block 602 can be indicative of the beginning of the query processing window for the particular query and operations corresponding to block 612 can be indicative of the end of the query processing window for the particular query.

FIG. 7 is a flow chart of an example process 700 for ordering search results. Result data specifying a received query and images identified as being responsive to the received query are received (702). For example, the search system 110 may provide the result data to the image analysis apparatus. The result data may also include a relevance score and/or an image content descriptor for each image.

A similarity score for the received query and each indexed query for which an image relevance model has been created is determined (704). For example, the image analysis apparatus 120 may determine the similarity scores for the received query and each query that is indexed in the image relevance model data store 116 and has a corresponding image relevance model. The similarity score for the received query and another query is a measure of similarity between the received query and the other query. In some implementations, an indexed query having a higher similarity score with respect to the received query than the similarity score for another indexed query is more similar to the received query than the other query. For example, an indexed query that exactly matches the received query may have the highest similarity score among all indexed queries.

Similarity scores can be determined based on a synonym score, an edit distance score, a transformation cost score, and/or a similarity measure based on co-click data. For example, a query having a small edit distance score or a high synonym score may have a high similarity score. These scores can be used to compute an overall similarity score between two queries. For example, the scores can be averaged, added, or weighted. In some implementations, a lookup table is used to determine the similarity scores. For example, the query can be compared to a lookup table having the queries for which a relevance model has been trained. If there is not a match, one or more optional terms may be removed from the query to create a revised query and the revised query may be compared to the lookup table. This can be performed multiple times until a match is found. The similarity score may be determined based on the revisions to the query.

A matching query is identified for the received query (706). If a query indexed in the image relevance model data store 116 exactly matches the received query, then the image analysis apparatus 120 may identify that indexed query as the matching query. If none of the queries indexed in the image relevance model data store 116 exactly matches the received query, then the image analysis apparatus 120 may identify the most similar indexed query. For example, the image analysis apparatus 120 may identify the indexed query having the highest similarity score with respect to the received query as the matching query.

An image relevance model for the matching query is identified (708). For example, the image analysis apparatus 120 may access the relevance model index of the image relevance model data store 116 to identify the image relevance model that has been trained for the matching query.

An image relevance score adjustment factor is determined for each image of the received result data (710). In some implementations, the image analysis apparatus 120 may use the identified image relevance model to determine the relevance score adjustment factors for the images. For example, the image analysis apparatus 120 may decompress the image content descriptor for each image. The image analysis apparatus 120 can determine the relevance score adjustment factor for each image by applying the identified image relevance model to the decompressed image content descriptor for the image. In implementations in which full-sized feature vectors are used in place of image content descriptors, the image analysis apparatus 120 may apply the feature vectors to the identified image relevance model to determine the relevance score adjustment factors.

In some implementations, the relevance score adjustment factors for the images are scaled or weighted using the similarity score for the received query and the indexed query associated with the image relevance model (712). For example, the image analysis apparatus 120 may multiply each relevance score adjustment factor by the similarity score to determine a scaled relevance score adjustment factor. Thus, a higher similarity score may result in higher relevance score adjustment factors.

The relevance score for each image is adjusted using the relevance score adjustment factor for the image (714). For example, the image analysis apparatus 120 may multiply the relevance score for an image by the relevance score adjustment factor for the image to determine an adjusted relevance score for the image.

The images are ranked according to the adjusted relevance scores (716). For example, the image analysis apparatus 120 may rank the images based on the adjusted relevance scores, where an image having a higher adjusted relevance score is ranked higher than an image having a lower adjusted relevance score.

In some implementations, the image analysis apparatus 120 sends rank data specifying the image ranking to the search system 110. In some implementations, the image analysis apparatus 120 generates image search results that reference the ranked images and transmits the image search results, for example to the user device 106 that submitted the query.

In some implementations, the image analysis apparatus 120 retrains each image relevance model after each use of the image relevance model, after a certain number of uses of the image relevance model, or periodically.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of this document or of what may be claimed, but rather as descriptions of features specific to particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   identifying, for each query in a set of queries in a historical data store that contains indexed queries, a respective number of images that have at least a minimum relevance score for the query;

training, for each query of multiple queries that have a respective number of images that exceeds a threshold number of images, a respective image relevance model for that query, while not training an image relevance model for any query that has a respective number of images that does not exceed the threshold number of images, wherein:
- each image relevance model outputs a relevance score adjustment factor for an image search result based on image feature values of the image that is referenced by the image search result; and
- each image relevance model is different from each other image relevance model;

receiving result data specifying a received search query and responsive image search results that reference images that are responsive to the received search query;

selecting, from the image relevance models trained for the queries that have a respective number of images that exceeds the threshold number of images and based on the received search query, an image relevance model for the received search query, including:
- determining, during a query processing window for the received search query, that the received search query is most similar to a given query of the multiple queries for which image relevance models have been trained, the determination being based on a similarity score for the received search query and the given query, the query processing window for the received search query being a period of time between receipt of the received search query and responsive search results being provided to a user device in response to the received search query;
- selecting, from the image relevance models trained for the queries that have a respective number of images that exceeds the threshold number of images, the image relevance model for the given query in response to the received search query being most similar to the given query;

for each of one or more of the responsive image search results that were specified by the result data and during the query processing window:
- determining, based on the image feature values of the image that is referenced by the responsive image search result, the relevance score adjustment factor for the responsive image search result, the relevance score adjustment factor being determined using the selected image relevance model; and
- adjusting, based on the relevance score adjustment factor, a relevance score for the responsive image search result;

ranking the responsive image search results based on the adjusted relevance score for the responsive image search result; and providing the ranked responsive image search results in response to the received search query.

2. The method of claim 1, further comprising:
identifying an image that has been previously identified as being relevant to the given query;
determining an estimated relevance score adjustment factor for the identified image, the estimated relevance score adjustment factor being based on an output of the image relevance model for the given query, the estimated relevance score adjustment factor being a value that is used by a search apparatus to determine whether the identified image is responsive to a search query that matches the given query; and
storing the estimated relevance score adjustment factor with a reference to the identified image.

3. The method of claim 2, wherein determining the relevance score adjustment factor for the responsive image search result comprises determining the relevance score adjustment factor for an image for which the estimated relevance score adjustment factor has not been determined.

4. The method of claim 2, wherein identifying the image that has been previously identified as being relevant to the given query comprises determining that:
- the identified image includes a label that matches the given query; and
- the image similarity score for the identified image and each of at least a threshold number of other images that have been identified as relevant to the given query meets a similarity score threshold.

5. The method of claim 1, further comprising scaling, for each of the one or more responsive image search results, the relevance score adjustment factor in proportion to a magnitude of the similarity score for the received search query and given query.

6. The method of claim 1, wherein determining that the search query matches the given query comprises:
- determining that the received search query is not an exact match to any of the queries for which image relevance models have been trained;
- in response to determining that the received search query is not an exact match to any of the queries for which image relevance models have been trained, determining a similarity score for each of one or more queries for which image relevance models have been trained, the similarity score for each query representing a similarity between the query and the received search query; and
- determining that the similarity score for the given query indicates that the received search query is most similar to the given query, wherein selecting the image relevance model for the given query comprises selecting the given query in response to determining that the similarity score for the given query indicates that the received search query is most similar to the given query.

7. The method of claim 1, wherein an image relevance model is trained only for indexed queries determined to be a query.

8. The method of claim 1, wherein training, for each query of multiple queries that have a respective number of images that exceeds a threshold number of images, an image relevance model that outputs a relevance score adjustment factor for an image search result based on image feature values of the image that is referenced by the image search result while not training an image relevance model for any query that has a respective number of images that does not exceed the threshold number of images comprises training each query for which at least a threshold number of images have at least a minimum relevance score for the query and at least a threshold number of user interactions have occurred with search results provided in response to receiving the query.

9. The method of claim 1, further comprising:
generating, for each responsive image search result, a compressed image content descriptor that represents the image feature values of the image search result, each image feature value representing a visual characteristic of the responsive image search result, the generating comprising:
- concatenating the image feature values of the image search result into a feature representation;

reducing a data size of the image feature values by generating hashes of the feature representation;

further reducing the data size of the image feature values by generating a vector of floating point numbers that represent the image search result using kernel principal component analysis;

generating the compressed image content descriptor by applying delta encoding to a proper subset of the floating point numbers in the vector of floating point numbers, the proper subset of the floating point numbers including a specified number of the floating point numbers having a highest variability among the floating point numbers; and storing each compressed image content descriptor in a cache;

wherein the selected image relevance model determines the relevance score adjustment factor for each image search result using the compressed image content descriptor for the responsive image search result.

10. A non-transitory computer storage medium encoded with a computer program, the program comprising instructions that when executed by data processing apparatus cause the data processing apparatus to perform operations comprising:

identifying, for each query in a set of queries in a historical data store that contains indexed queries, a respective number of images that have at least a minimum relevance score for the query;

training, for each query of multiple queries that have a respective number of images that exceeds a threshold number of images, a respective image relevance model for that query, while not training an image relevance model for any query that has a respective number of images that does not exceed the threshold number of images, wherein:

each image relevance model outputs a relevance score adjustment factor for an image search result based on image feature values of the image that is referenced by the image search result; and each image relevance model is different from each other image relevance model;

receiving result data specifying a received search query and responsive image search results that reference images that are responsive to the received search query;

selecting, from the image relevance models trained for the queries that have a respective number of images that exceeds the threshold number of images and based on the received search query, an image relevance model for the received search query, including:

determining, during a query processing window for the received search query, that the received search query is most similar to a given query of the multiple queries for which image relevance models have been trained, the determination being based on a similarity score for the received search query and the given query, the query processing window for the received search query being a period of time between receipt of the received search query and responsive search results being provided to a user device in response to the received search query;

selecting, from the image relevance models trained for the queries that have a respective number of images that exceeds the threshold number of images, the image relevance model for the given query in response to the received search query being most similar to the given query;

for each of one or more of the responsive image search results that were specified by the result data and during the query processing window:

determining, based on the image feature values of the image that is referenced by the responsive image search result, the relevance score adjustment factor for the responsive image search result, the relevance score adjustment factor being determined using the selected image relevance model; and adjusting, based on the relevance score adjustment factor, a relevance score for the responsive image search result;

ranking the responsive image search results based on the adjusted relevance score for the responsive image search result; and providing the ranked responsive image search results in response to the received search query.

11. The non-transitory computer storage medium of claim 10, wherein the instructions that when executed by data processing apparatus cause the data processing apparatus to perform further operations comprising:

identifying an image that has been previously identified as being relevant to the given query;

determining an estimated relevance score adjustment factor for the identified image, the estimated relevance score adjustment factor being based on an output of the image relevance model for the given query, the estimated relevance score adjustment factor being a value that is used by a search apparatus to determine whether the identified image is responsive to a search query that matches the given query; and storing the estimated relevance score adjustment factor with a reference to the identified image.

12. The non-transitory computer storage medium of claim 11, wherein determining the relevance score adjustment factor for the responsive image search result comprises determining the relevance score adjustment factor for an image for which the estimated relevance score adjustment factor has not been determined.

13. The non-transitory computer storage medium of claim 10, wherein the instructions that when executed by data processing apparatus cause the data processing apparatus to perform further operations comprising scaling, for each of the one or more responsive image search results, the relevance score adjustment factor in proportion to a magnitude of the similarity score for the received search query and given query.

14. A system comprising:

a data store for storing image relevance models; and one or more processors configured to interact with the data store, the one or more processors being further configured to perform operations comprising:

identifying, for each query in a set of queries in a historical data store that contains indexed queries, a respective number of images that have at least a minimum relevance score for the query;

training, for each query of multiple queries that have a respective number of images that exceeds a threshold number of images, a respective image relevance model for that query, while not training an image relevance model for any query that has a respective number of images that does not exceed the threshold number of images, wherein:

each image relevance model outputs a relevance score adjustment factor for an image search result based on image feature values of the image that is referenced by the image search result; and each image relevance model is different from each other image relevance model;

receiving result data specifying a received search query and responsive image search results that reference images that are responsive to the received search query;

selecting, from the image relevance models trained for the queries that have a respective number of images that exceeds the threshold number of images and based on the received search query, an image relevance model for the received search query, including:

determining, during a query processing window for the received search query, that the received search query is most similar to a given query of the multiple queries for which image relevance models have been trained, the determination being based on a similarity score for the received search query and the given query, the query processing window for the received search query being a period of time between receipt of the received search query and responsive search results being provided to a user device in response to the received search query;

selecting, from the image relevance models trained for the queries that have a respective number of images that exceeds the threshold number of images, the image relevance model for the given query in response to the received search query being most similar to the given query;

for each of one or more of the responsive image search results that were specified by the result data and during the query processing window:

determining, based on the image feature values of the image that is referenced by the responsive image search result, the relevance score adjustment factor for the responsive image search result, the relevance score adjustment factor being determined using the selected image relevance model; and adjusting, based on the relevance score adjustment factor, a relevance score for the responsive image search result;

ranking the responsive image search results based on the adjusted relevance score for the responsive image search result; and providing the ranked responsive image search results in response to the received search query.

15. The system of claim 14, wherein the one or more processors are further configured to perform operations comprising:

identifying an image that has been previously identified as being relevant to the given query;

determining an estimated relevance score adjustment factor for the identified image, the estimated relevance score adjustment factor being based on an output of the image relevance model for the given query, the estimated relevance score adjustment factor being a value that is used by a search apparatus to determine whether the identified image is responsive to a search query that matches the given query; and storing the estimated relevance score adjustment factor with a reference to the identified image.

16. The system of claim 15, wherein determining the relevance score adjustment factor for the responsive image search result comprises determining the relevance score adjustment factor for an image for which the estimated relevance score adjustment factor has not been determined.

17. The system of claim 15, wherein identifying the image that has been previously identified as being relevant to the given query comprises determining that:

the identified image includes a label that matches the given query; and the image similarity score for the identified image and each of at least a threshold number of other images that have been identified as relevant to the given query meets a similarity score threshold.

18. The system of claim 14, wherein the one or more processors are further configured to perform operations comprising scaling, for each of the one or more responsive image search results, the relevance score adjustment factor in proportion to a magnitude of the similarity score for the received search query and given query.

* * * * *